(12) United States Patent
Fried et al.

(10) Patent No.: US 10,134,165 B2
(45) Date of Patent: *Nov. 20, 2018

(54) IMAGE DISTRACTOR DETECTION AND PROCESSING

(71) Applicant: Adobe Systems Incorporated, San Jose, CA (US)

(72) Inventors: Ohad I. Fried, Be'er-Sheva (IL); Elya Shechtman, Seattle, WA (US); Daniel R. Goldman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,911

(22) Filed: May 17, 2017

(65) Prior Publication Data
US 2017/0249769 A1 Aug. 31, 2017

Related U.S. Application Data

(63) Continuation of application No. 14/812,841, filed on Jul. 29, 2015, now Pat. No. 9,665,962.

(51) Int. Cl.
*G06K 9/40* (2006.01)
*G09G 5/00* (2006.01)
(Continued)

(52) U.S. Cl.
CPC ............ *G06T 11/60* (2013.01); *G06K 9/4671* (2013.01); *G06T 5/002* (2013.01); *G06T 5/005* (2013.01);
(Continued)

(58) Field of Classification Search
CPC .......... G06K 9/66; G06K 9/4628; G06K 9/32; G06K 9/00127; G06K 9/00456; G06K 9/6267; G06T 11/60; G06T 7/0081; G06T 3/40; G06T 5/002; G06T 2207/20081; G06T 2207/10004
(Continued)

(56) References Cited

U.S. PATENT DOCUMENTS 7,540,615 B2 * 6/2009 Merzenich ............... G09B 7/04
351/203
8,358,855 B2 * 1/2013 Hamza ................. G06K 9/0063
382/218

(Continued)

OTHER PUBLICATIONS

"Notice of Allowance", U.S. Appl. No. 14/812,841, dated Jan. 26, 2017, 11 pages.

(Continued)

*Primary Examiner* — Sheela C Chawan
(74) *Attorney, Agent, or Firm* — Wolfe-SBMC

(57) ABSTRACT

Image distractor detection and processing techniques are described. In one or more implementations, a digital medium environment is configured for image distractor detection that includes detecting one or more locations within the image automatically and without user intervention by the one or more computing devices that include one or more distractors that are likely to be considered by a user as distracting from content within the image. The detection includes forming a plurality of segments from the image by the one or more computing devices and calculating a score for each of the plurality of segments that is indicative of a relative likelihood that a respective said segment is considered a distractor within the image. The calculation is performed using a distractor model trained using machine learning as applied to a plurality images having ground truth distractor locations.

20 Claims, 8 Drawing Sheets

(51) Int. Cl.
*G06T 11/60* (2006.01)
*G06T 7/11* (2017.01)
*G06T 5/00* (2006.01)
*G06K 9/46* (2006.01)

(52) U.S. Cl.
CPC ...... *G06T 7/11* (2017.01); *G06T 2207/10004* (2013.01); *G06T 2207/20081* (2013.01)

(58) Field of Classification Search
USPC ....... 382/156, 275, 254, 173, 181, 190, 224; 345/4, 6, 7, 9, 418, 619, 629, 634; 606/57, 282
See application file for complete search history.

(56) References Cited

U.S. PATENT DOCUMENTS

| | | | |
|---|---|---|---|
| 9,424,671 B1* | 8/2016 | DiVerdi | G06T 11/206 |
| 9,665,962 B2* | 5/2017 | Fried | G06T 11/60 |
| 2005/0153267 A1* | 7/2005 | Goldman | G09B 7/00 434/308 |
| 2013/0148910 A1* | 6/2013 | Fredembach | G06K 9/40 382/275 |
| 2013/0243312 A1* | 9/2013 | Sato | G06T 7/0089 382/164 |
| 2015/0046953 A1* | 2/2015 | Davidson | G06K 9/00758 725/74 |
| 2016/0063692 A1* | 3/2016 | Divakaran | G06K 9/4642 382/110 |
| 2016/0063734 A1* | 3/2016 | Divakaran | G06K 9/4642 382/110 |
| 2017/0032551 A1 | 2/2017 | Fried et al. | |

OTHER PUBLICATIONS

"Pre-Interview Communication", U.S. Appl. No. 14/812,841, dated Sep. 23, 2016, 3 pages.

* cited by examiner

IMAGE DISTRACTOR DETECTION AND PROCESSING

RELATED APPLICATIONS

This patent application is a continuation of and claims priority to copending U.S. patent application Ser. No. 14/812,841, filed on Jul. 29, 2015, the disclosure of which is incorporated herein by reference in its entirety.

BACKGROUND

The amount of images captured by users has increased exponentially due to the increase in image capture device availability, e.g., cameras as part of mobile phones and tablets. Even a casual user may capture hundreds of images in a variety of different settings, such as indoors (e.g., at a user's home) as well as outdoors (e.g., a kids sporting event).

As these images are typically captured in a casual manner, however, the images may include distractors, which are objects included in the image that may distract a user from primary content in the image that is the subject of the image. For example, an image captured of a couple in a beach setting may also include other objects that are not relevant to the couple or the beach setting, such as a dog running in the background, a waste receptacle, and so forth. Thus, the dog and the receptacle may distract from the primary content of the image, i.e., the couple at the beach in this example. Conventional techniques used to remove distractors from images, however, typically required users to manually indicate which objects are considered distracting as part of an object removal process and are not able to be generalized to support automatic detection and removal.

SUMMARY

Image distractor detection and processing techniques are described. In one or more implementations, a digital medium environment is configured for image distractor detection that includes detecting one or more locations within the image automatically and without user intervention by the one or more computing devices that include one or more distractors that are likely to be considered by a user as distracting from content within the image. The detection includes forming a plurality of segments from the image by the one or more computing devices and calculating a score for each of the plurality of segments that is indicative of a relative likelihood that a respective said segment is considered a distractor within the image. The calculation is performed using a distractor model trained using machine learning as applied to a plurality images having ground truth distractor locations.

In one or more implementations, a digital medium environment is configured for image distractor detection by generating a distractor model usable to detect inclusion of distractors within images that are likely to be considered by a user as distracting from content within the image. A plurality of images are received by the one or more computing devices having tagged distractor locations. Values are calculated by the one or more computing devices for a set of features for respective ones of a plurality of segments within respective ones of the plurality of images. The distractor model is generated by the one or more computing devices using one or more machine learning techniques in which the distractor model is trained for detection of the distractors, the generating using the calculated values and the plurality of images having distractor locations tagged that function as a ground truth for the one or more machine learning techniques.

In one or more implementations, a digital medium environment for image distractor detection includes a system having a distractor processing system, implemented by one or more computing devices, to detect one or more locations within the image automatically and without user intervention that include one or more distractors that are likely to be considered by a user as distracting from content within the image. The distractor processing system includes a segmentation module implemented at least partially in hardware to form a plurality of segments from the image. The distractor processing system also includes a segment prediction module implemented at least partially in hardware to calculate a score for each of the plurality of segments that is indicative of a relative likelihood that a respective segment is considered a distractor within the image. The calculation is performed using a distractor model trained using machine learning as applied to a plurality images having ground truth distractor locations. The distractor processing system also includes a distractor removal module implemented at least partially in hardware to control removal of the one or more distractors.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
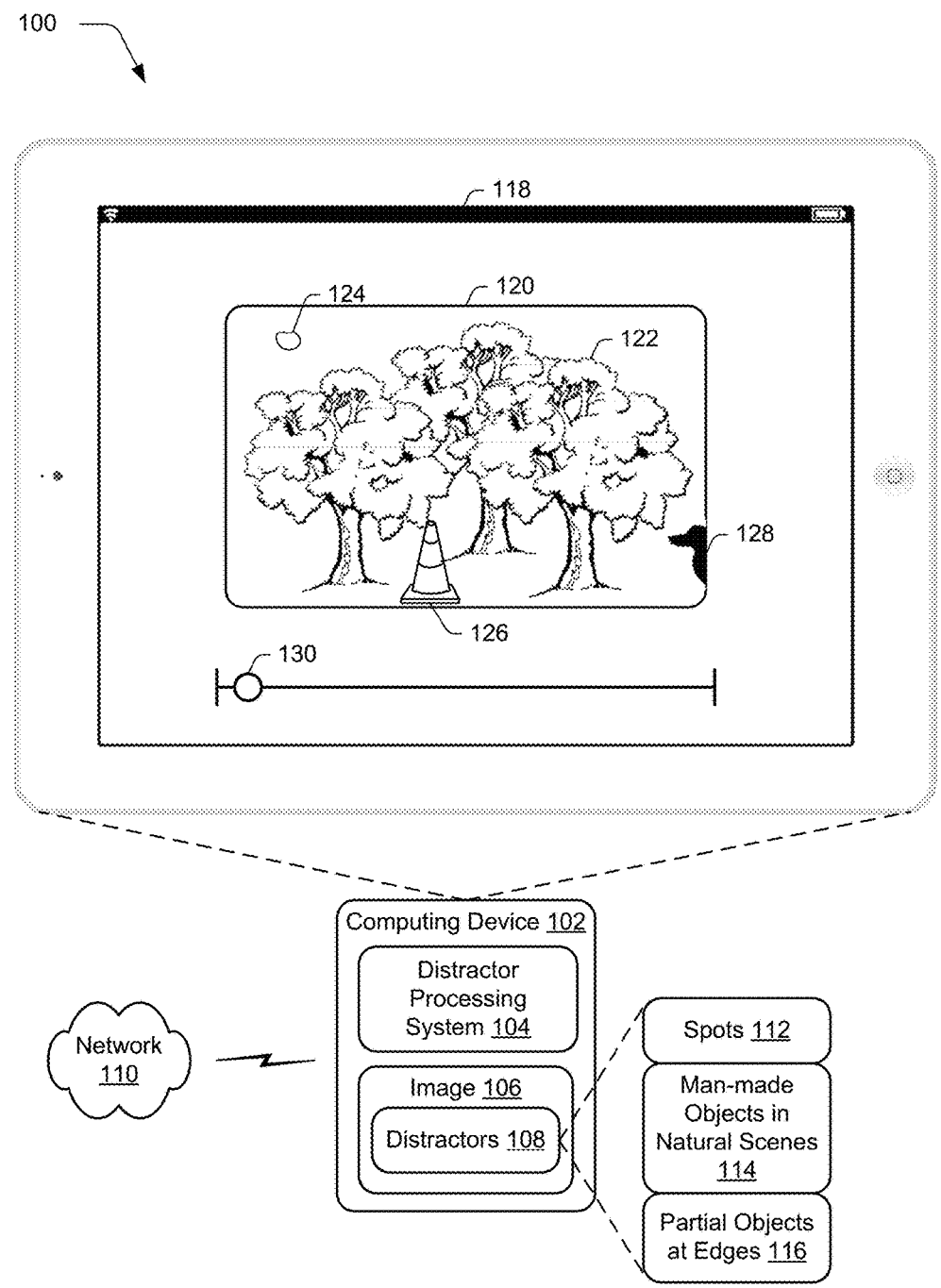
FIG. 1 is an illustration of an environment in an example implementation that is operable to employ techniques described herein.

Distractors refer to objects included in images that distract from desired overall content of the image, e.g., content and corresponding objects that are desired to be a primary or even secondary subject matter of the image by a user that captured the image. A user, for instance, may capture a "selfie" of the user along with a friend at a sporting event. In this instance, the user and the friend are the content that is the primary subject matter of the image along with other content pertaining to the sporting event, e.g., a playing field, logo of a sporting team, and so on that may be considered secondary to the users. However, the image may also include a distractor that distracts from this primary subject matter, such as a person in the background staring directly into the camera. Accordingly, inclusion of the distractor may render the image unsuitable for its desired purpose and frustrate the user capturing the image.

Conventional techniques used to remove distractors from images had limited functionality. The most common technique involves object removal in which a user manually identifies objects to be removed that are considered distracting, and thus is inefficient and cumbersome. Although an automated technique has been developed, that technique is limited to a single type of distractor (e.g., spots) and is not capable of generalization to other distractors (e.g., the person staring at the camera above) and thus is incapable of recognizing those other types of distractors.

Image distractor and processing techniques are described that are usable to support generic image distractor detection and removal through use of a distractor model. The distractor model is formed using machine learning techniques applied to a database of images having ground truth distractor locations. The images, for instance, may be manually tagged by users to identify locations of distractors in the images to serve as a ground truth. A set of features is also calculated per segment in the images (e.g., pixel, super pixel, patch) and then through use of the ground truth distractor locations from the manually tagged images, the distractor model is trained using machine learning as a predictor for distractors within images and thus may generalize to a variety of types of distractors.

The distractor model is then used to identify whether subsequent images include distractors automatically and without user intervention. In one or more implementations, the distractor model is configured to rank distractors and a user interface control (e.g., slider) supports user interaction to specify which distractors are removed from the subsequent image based on the ranking. A variety of other controls are also contemplated as described in the following. Thus, the distractor model learned through machine learning may generalize to a variety of different types of distractors, which may be used to detect the distractors automatically and without user intervention.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ image distractor detection and processing techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The computing device 102 is illustrated as including a distractor processing system 104 that is representative of functionality implemented at least partially in hardware to process an image 106 to locate distractors 108 within the image 106. Although the distractor processing system 104 is illustrated as implemented locally on the computing device 102, functionality represented by the distractor processing system 104 may also be implemented as split between the computing device 102 and functionality (e.g., a web service) accessible via the network 110, implemented solely via the web service, and so on.

The distractor processing system 104 is configured to support generic and generalized automatic detection of distractors 108 in an image. As such, a variety of types of distractors 108 may be detected by the distractor processing system 104, such as spots 112, manmade objects in natural scenes 114, partial objects located at edges 116 of the image 106 (e.g., cropped objects), and so on. A variety of other examples of distractors are also contemplated, such as background objects that are unrelated to foreground objects; text (e.g., writing on a wall or object); wires and poles; shadows and highlights; other types of spots such as speckles, stains, dust; unnatural colors that do not correspond without colors of primary subject matter of the image 106; and semantic and context dependent objects such as to include power pole in a downtown city scene as relevant but not in a rural scene. The distractor processing system 104 may then remove the distractors 108, which includes reduction in appearance (e.g., blurring, removal of contrast, desaturation, color transfer), object removal (e.g., content aware fill and hole filling), and so on.

In the illustrated example, a display device 118 of the computing device 102 displays an image 120 having a primary subject matter of a forest scene 122 and thus objects such as the trees, ground, and sky define the content that is desired to be viewed by a user, i.e., the primary subject matter of the image 120. The image 120 also includes objects that are considered to distract from this content, which are referred to as distractors 108 as described above. Illustrated examples of the distractors include a spot 124 e.g., from a fleck of dust or water disposed on a lens of an image capture device that captured the image. The image 120 also includes a traffic cone 126 which is an example of a man-made object in a natural scene 114 which is unexpected to a user viewing the image 120 and is thus considered distracting. Another example is a cropped object 128 involving a dog and is thus a partial object at an edge 116 of the image 120. As the object is cropped it is likely that the object does not pertain to the primary subject matter of the image 120 and also is considered as a distractor 108 as a user's eye is typically drawn to this partial object and away from the forest scene.

The distractor processing system 104 is thus configured to support generic and generalized automatic image distractor detection that employs a distinction between types of saliency (e.g., prominence) of content within an image, such as salient objects that are part of the primary subject matter of the image 120 and salient distractors that distract from the primary subject matter as further described below. This may be performed in a variety of ways, an example of which begins with a discussion of FIGS. 2, 3, and 6 in which machine learning techniques are described to generate a distractor model. Use of the distractor model to detect and remove distractors 108 is subsequently described in relation to FIGS. 4, 5, and 7.

Figure 2:
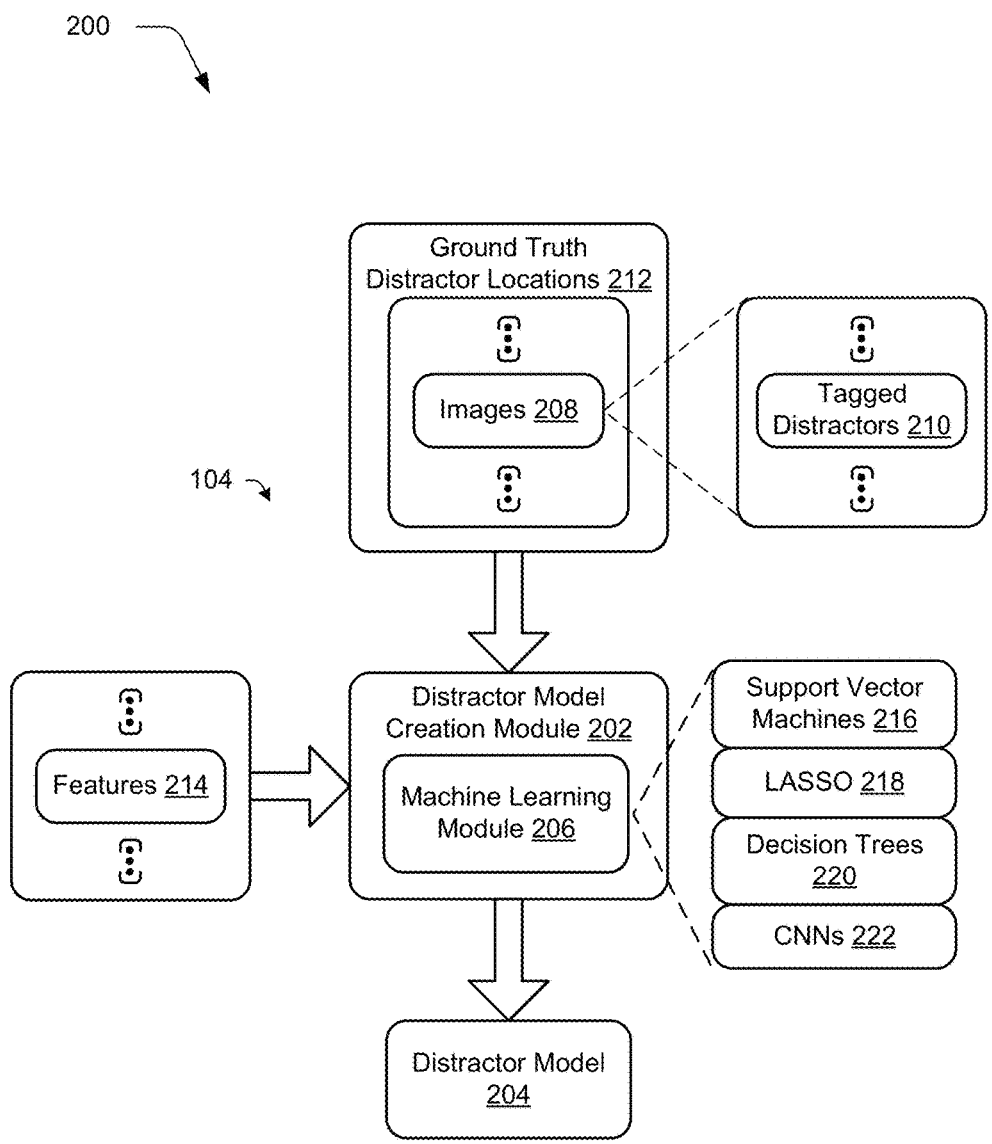
FIG. 2 depicts a system in example implementation in which a distractor model is generated using machine learning techniques that is usable to detect presence of distractors in subsequent images.

FIG. 2 depicts a system 200 in an example implementation usable to create a model configured to identify distractors within an image by the distractor processing system 104 of FIG. 1. A distractor model creation module 202 of the distractor processing system 104 is representative of functionality to generate a distractor module 204 that is usable to detect distractors 108 in an image 106. In this example, the distractor model creation module 202 employs a machine learning module 206 to generate the model, although other examples are also contemplated.

Figure 3:
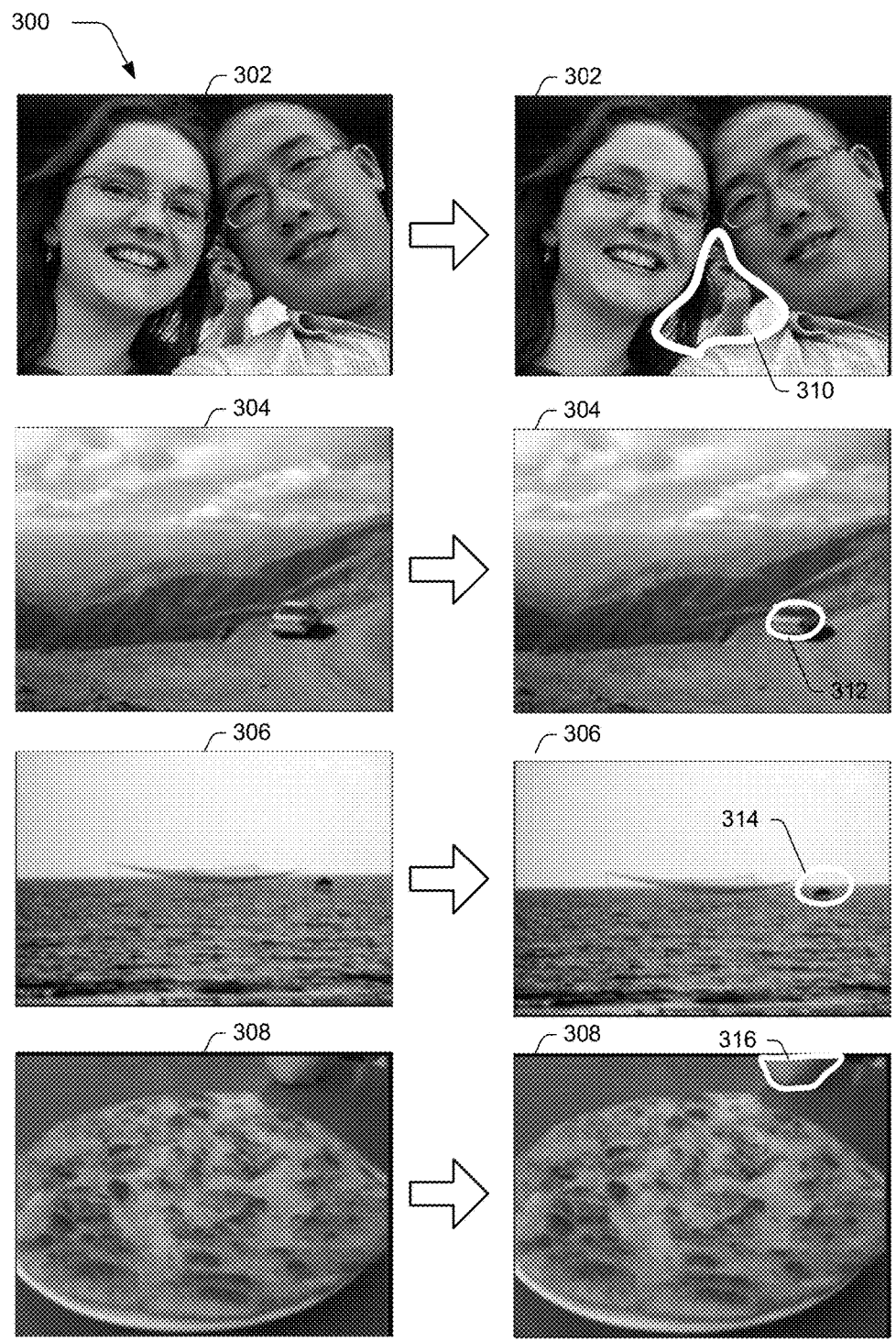
FIG. 3 depicts an example of forming ground truth distractor locations through tagging of distractors in images that is usable to train the distractor model of FIG. 2.

To train the machine learning module 206, a set of images 208 are obtained having tagged distractors 210 such that locations of the distractors within the images are indicated to function as ground truth distractor locations 212. The images 208 and the tagged distractors 210 may be specified in a variety of ways. As shown in FIG. 3, for instance, a collection 300 of images 302, 304, 306, 308 is provided to users for manual processing through exposure via a user interface. A user may then interact with tools (e.g., a freeform drawing tool, highlighter, obscuring tool) to indicate one or more portions of the images 302, 304, 306, 308 that are considered distracting and thus are distractors.

For image 302, for instance, primary subject matter includes two people taking a selfie. The image 302 also includes a person in the background looking directly at the camera and thus is considered a distractor 310, which is circled and thus a location of the distractor is tagged. In image 304, a nature scene of a hilly landscape is shown with a car that is considered as distracting from the nature scene and thus is circled as a distractor.

Likewise, an image 306 of an ocean scene is shown with a buoy or platform that is considered a distractor 314 due to distraction from a fishing net and water of an ocean scene. For image 308, a person's elbow at an edge of the image 308 is considered as a distractor 316 from primary subject matter of a pizza. In this way, a distinction is made by users between types of saliency, such as salient objects that are part of the primary subject matter of the image 120 (e.g., the people, landscape, ocean, and pizza) and salient distractors that distract from the primary subject matter (e.g., the bystander, car, buoy, and elbow) which may be learned by the machine learning module 206.

Return is now be made to FIG. 2, in which the machine learning module 206 receives the images 208 and tagged distractors 210 that act as ground truth distractor locations 212 to generate the distractor model 204. First, values are calculated for a set of features for segments (e.g., individual pixels, super pixels, patches) of the images 208. A variety of features may be used, such as color values and histograms; average color in a segment; storable pyramid sub-bands; color probabilities; HOG in window; distance to center; distance to closest edge; car detector; people detector; face detector; text detector, Hou saliency, Itti & Koch saliency; PCA saliency; Torralba salience; relative saliency to a highest peak; distance to highest saliency peak; size of segment; relative size to most salient segment; GIST; global features per image area; concentric rings around a pixel; saliency maps—distance from edges; saliency maps—distance from primary peak; Poselets; scene classification-side-face detector; people detector with relation towards main person; dense SIFT; saliency via context elements; convolutional neural network (CNN) features; and so forth.

The machine learning module 206 then uses the set of features 214 and the ground truth distractor locations 212 to train the distractor model 204 as a predictor of distractors 108, an example of which is illustrated in the following expression:

$$P(distractor|f,F,c,s)$$

where "f" describes local features, "F" describes other peaks' features, "c" is an image class, and "s" is a segment type. The machine learning module 206 may use a variety of techniques to perform machine learning, including support vector machines 216, LASSO 218, decision trees 220, convolutional neural networks (CNNs) 222, and so forth. The distractor model 204 is then usable to identify distractors in subsequent images, further description of which is included in the following and shown in corresponding figures.

Figure 4:
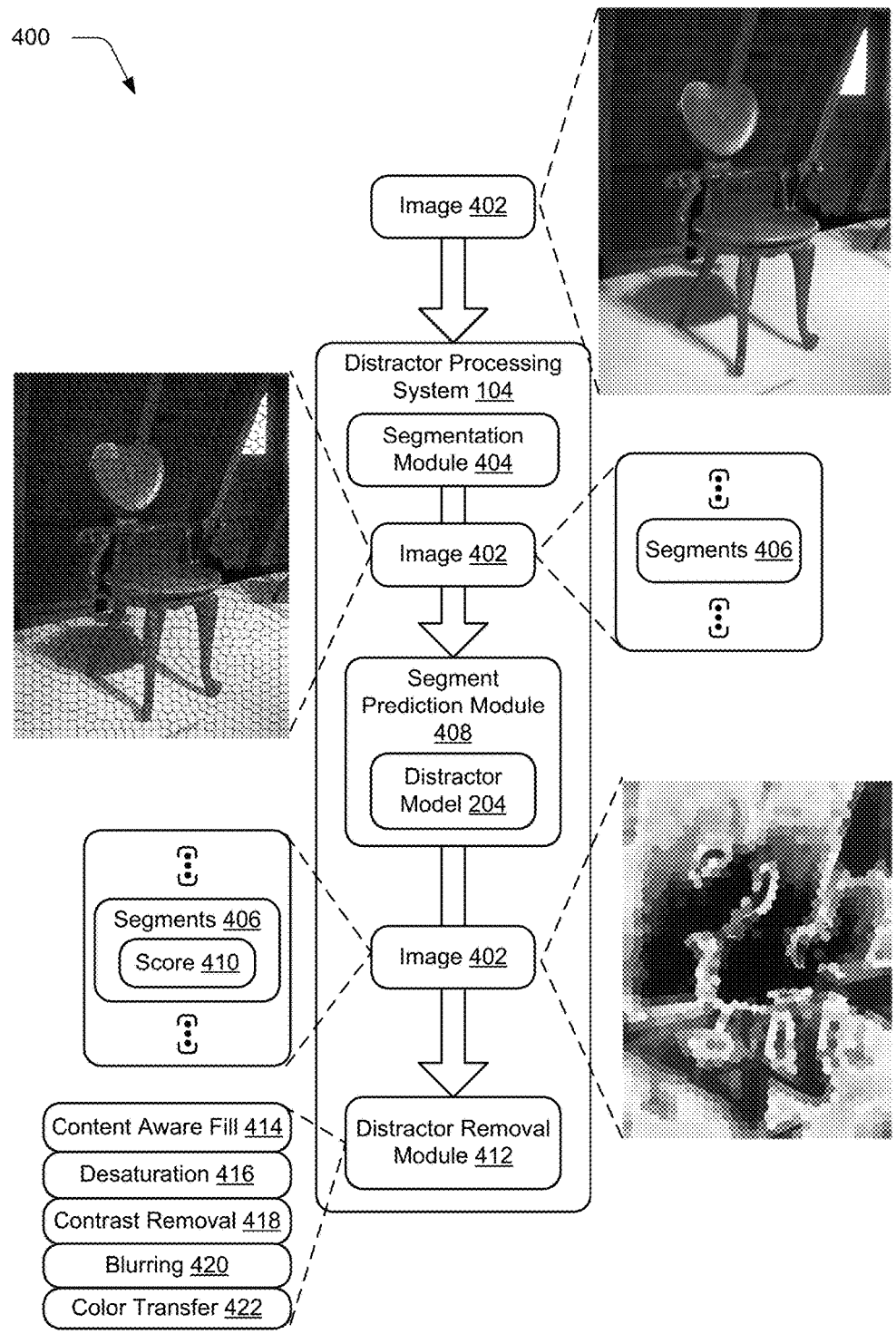
FIG. 4 depicts a system in example implementation in which a distractor model generated in FIG. 2 is used to detect presence of distractors in subsequent images.

FIG. 4 depicts a system 400 in example implementation in which a distractor model 204 generated in FIG. 2 is used to detect presence of distractors in subsequent images. In this example, the distractor processing system 104 receives an image 402 that was not used to train the distractor model 204 in FIG. 2. The distractor processing system 104 first employs a segmentation module 404 to form a plurality of segments 406 as individual portions of the image 402. A variety of techniques are usable to support the segmentation, such as an SLIC super pixel technique, edge detection, clustering, and so forth.

The segments 406 of the image 402 are then processed by a segment prediction module 408 using the distractor model 204. The segment prediction module 408 uses the distractor model 204 to calculate a score 410 for each of the segments 406 that is indicative of a likelihood that the segment is considered a distractor, which is illustrated through use of different shades for the segments in the illustration.

The scores 410 are configurable in a variety of ways. For example, the score 410 may be generalized to indicate an overall likelihood of the segment 406 being considered a distractor. In another example, the score 410 is configured to indicate a likelihood of a type of distractor, e.g., spots 112, man-made objects in natural scenes 114, partial objects at edges 116, and so on as previously described. For example, a plurality of distractor models 204 may be learned using the process described in relation to FIG. 2, each corresponding to a respective type of distractor. Thus, processing by particular models may be used to indicate likelihoods of corresponding types of distractors. In one or more implementations, the segment prediction module 408 may include functionality usable to detect objects or subject matter of the image 402 (e.g., a landscape) and then select one or more distractor models 204 that are usable to types of distractors for that subject matter, e.g., man-made objects.

The scores 410 for the corresponding segments 406 are then usable by a distractor removal module 412 to control removal of the distractors. For example, the distractor removal module 412 may rank the segments 406 based on the scores 410. In one or more implementations the ranking may also take into account location of the segments 406, such as to follow an "outside in" approach due to the realization that distractors are typically located along an edge of an image 402 while primary subject matter that is desired by a user is located in the center of the image 402.

A control 130 as shown in FIG. 1 may then be used to control an amount of distractors removed, such as by sliding the control 130 to the right to cause more distractors to be removed and left to lower the number removed based on the ranking. A variety of other examples are also contemplated, such as to highlight potential distractors for selection by a user for removal, automatic removal of distractors that have scores 410 above a threshold amount, and so on.

The distractor removal module 412 may employ a variety of techniques to remove the distractors from the image 402. For example, a content aware fill 414 technique may be used, also referred to as "hole filling," to replace pixels at locations of the images having descriptors, i.e., segments associated with the descriptor, with pixels generated based on pixels in the image outside this location. Other examples are also contemplated that are used to de-emphasize the descriptors, such as desaturation 416, contrast removal 418, blurring 420, and color transfer 422. Other examples of distractor removal are also contemplated, such as retargeting as further described in the following and shown in a corresponding figure.

Figure 5:
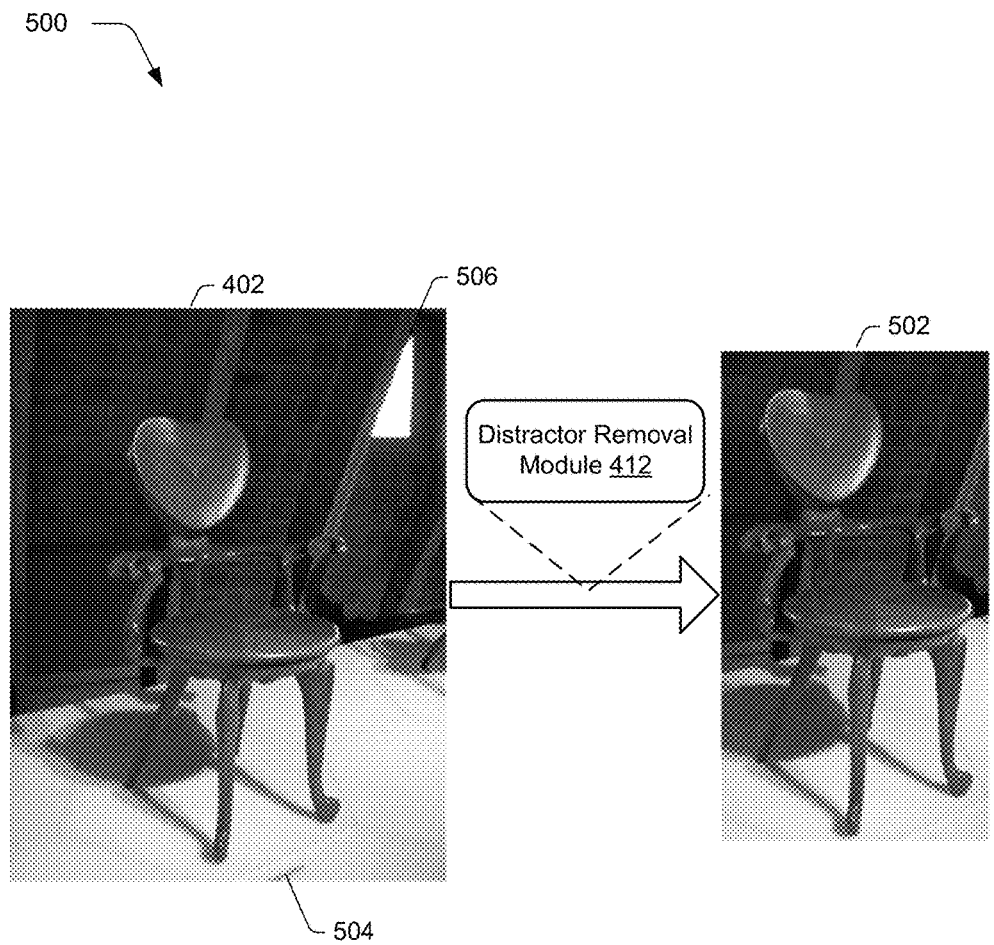
FIG. 5 depicts an example implementation of distractor removal through retargeting.

FIG. 5 depicts an example implementation 500 of distractor removal through retargeting. In this example, a user wishes to resize the image. Instead of resizing uniformly, the distractor removal module 412 bases the resizing on distractors detected in the image 402 to form a resized image 502. In the illustrated instance, distractors including a stain on the floor 504 and a partial object of a window 506 are cropped from the image 402 to form image 502. The techniques described herein are usable to support a variety of other functionality, such as to improve image saliency models such that given a saliency map "S" and a distractor map "D", removal of distractors from the saliency map based on the distractor map is used to improve saliency.

Example Procedures

The following discussion describes image distractor detection and processing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
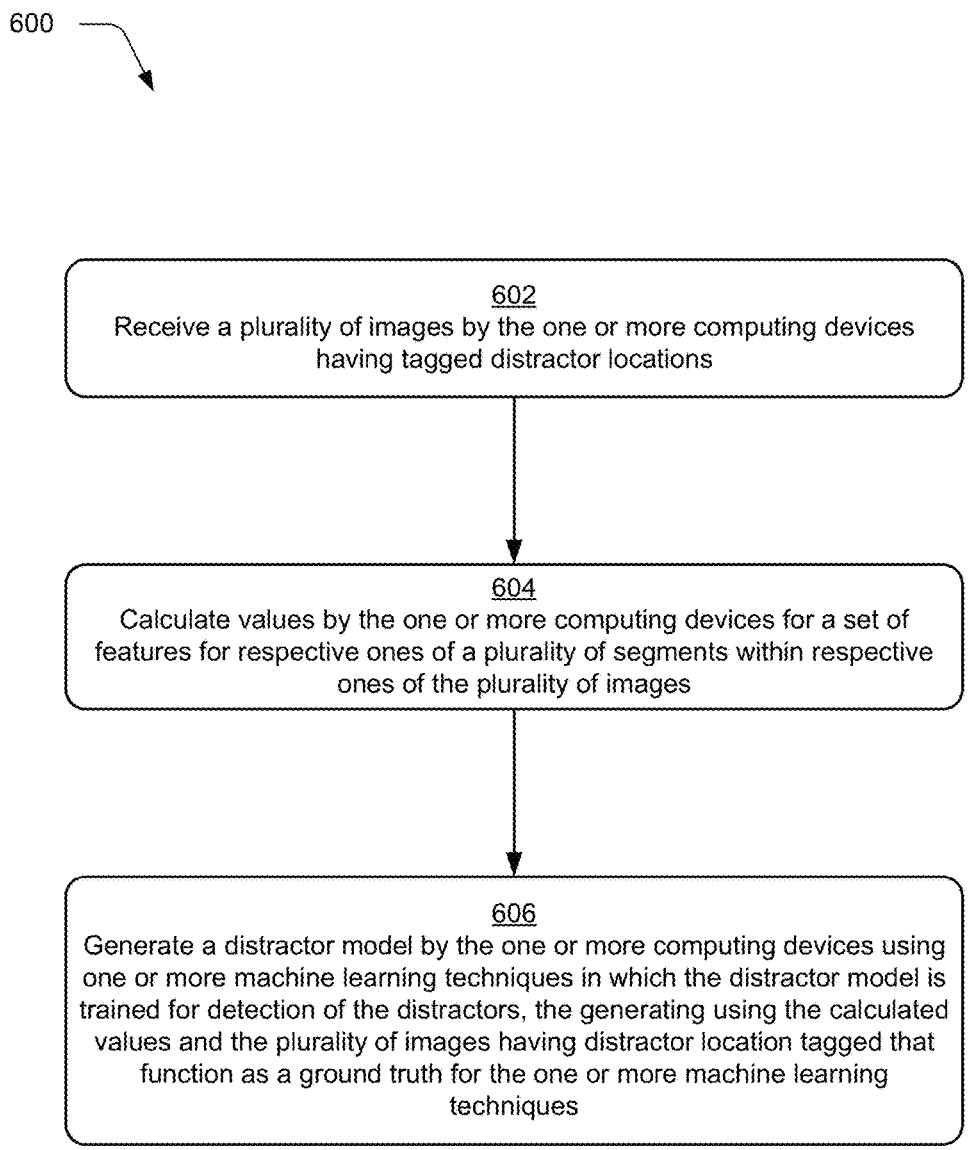
FIG. 6 is a flow diagram depicting a procedure in an example implementation in which a distractor model is generated using machine learning.

FIG. 6 depicts a procedure 600 in an example implementation in which a distractor model is generated using machine learning. In this example, a digital medium environment is configured for image distractor detection by generating a distractor model usable to detect inclusion of distractors within images that are likely to be considered by a user as distracting from content within the image. A plurality of images are received by the one or more computing devices having tagged distractor locations (block 602). The distractor model creation module 202, for instance, receives images 208 having tagged distractors 210 that act as ground truth distractor locations 212.

Values are calculated by the one or more computing devices for a set of features for respective ones of a plurality of segments within respective ones of the plurality of images (block 604). Continuing with the previous example, features 214 are also received by the distractor model creation model 202 that describe characteristics of the images 208, which are used to calculate values for those features for the images 208.

The distractor model is generated by the one or more computing devices using one or more machine learning techniques in which the distractor model is trained for detection of the distractors. The generation of which uses the calculated values and the plurality of images having distractor location tagged that function as a ground truth for the one or more machine learning techniques (block 606). The distractor model creation module 202, for instance, uses a machine learning module 206 to generate the distractor model based on the ground truth distractor locations 212 and the calculated values of the features 214. A variety of machine learning techniques are usable, such as decision trees 220, LASSO 218, support vector machines 216, or convolutional neural networks (CNNs) 222.

Figure 7:
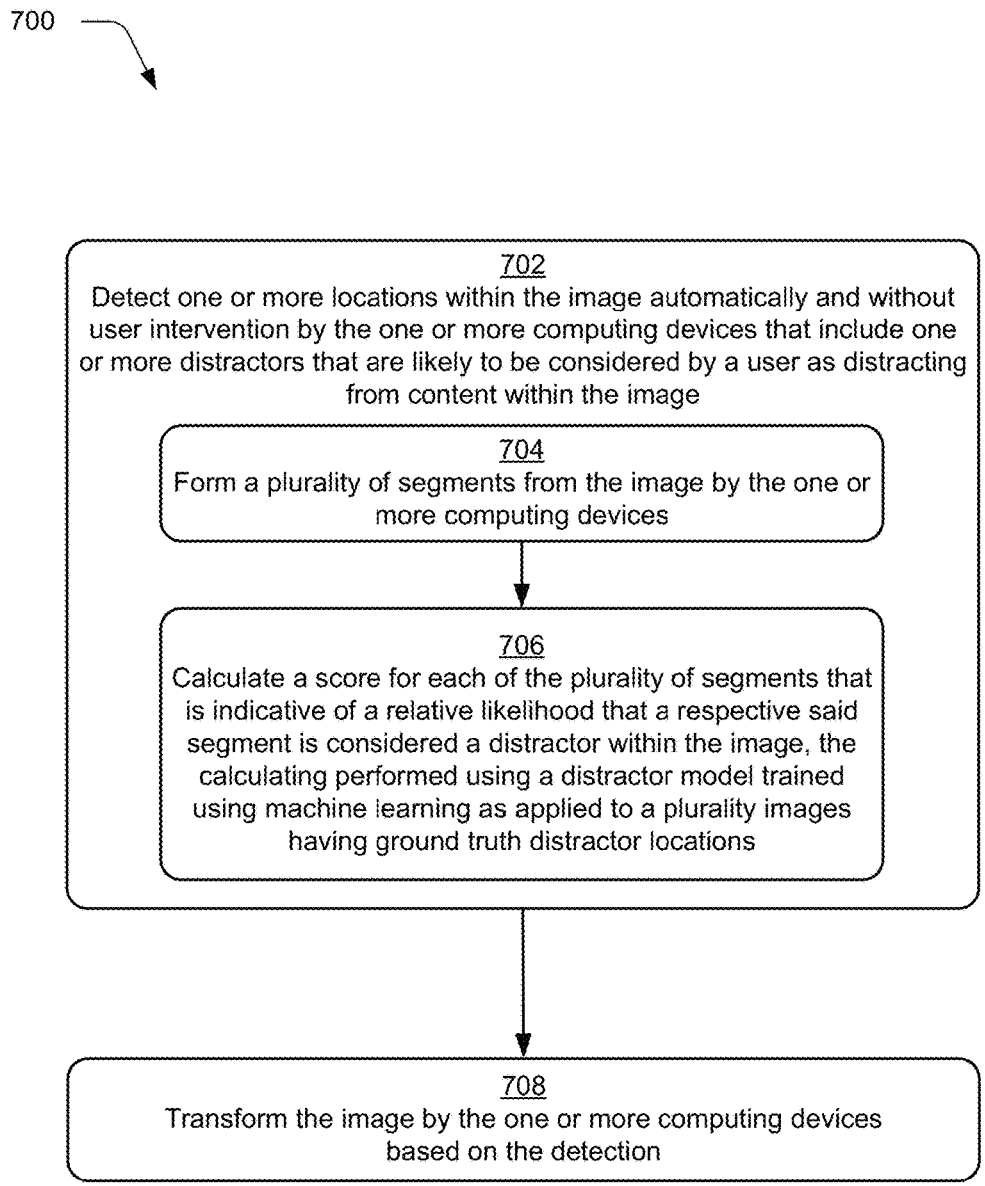
FIG. 7 is a flow diagram depicting a procedure in an example implementation in which distractors are detected and removed from an image using a distractor model.

FIG. 7 depicts a procedure 700 in an example implementation in which distractors are detected and removed from an image using a distractor model. In this example, a digital medium environment is configured for image distractor detection that includes detecting one or more locations within the image automatically and without user intervention by the one or more computing devices that include one or more distractors that are likely to be considered by a user as distracting from content within the image (block 702). As previously described, distractors 108 may draw a user's attention away from primary subject matter of the image 402, such as spots, man-made objects in natural scenes, partial objects at edges, and so on.

The detection includes forming a plurality of segments from the image by the one or more computing devices and calculating a score for each of the plurality of segments that is indicative of a relative likelihood that a respective said segment is considered a distractor within the image (block 704). The calculation is performed using a distractor model trained using machine learning as applied to a plurality images having ground truth distractor locations (block 706). The distractor processing system 104, for instance, may employ a segmentation module 404 to form a plurality of segments 406 from the image 402. The segment prediction module 408 then employs a distractor model 204 to calculate a score 410 for each of the segments.

The image is transformed by the one or more computing devices based on the detecting (block 708). This include removal of distractors by a content aware fill 414, desaturation 416, contrast removal 416, blurring 420, color transfer 422, retargeting as shown in FIG. 5, and so forth. In this way, generic distractors may be removed automatically and without user intervention from the image 402, which is not possible using conventional techniques.

Example System and Device

Figure 8:
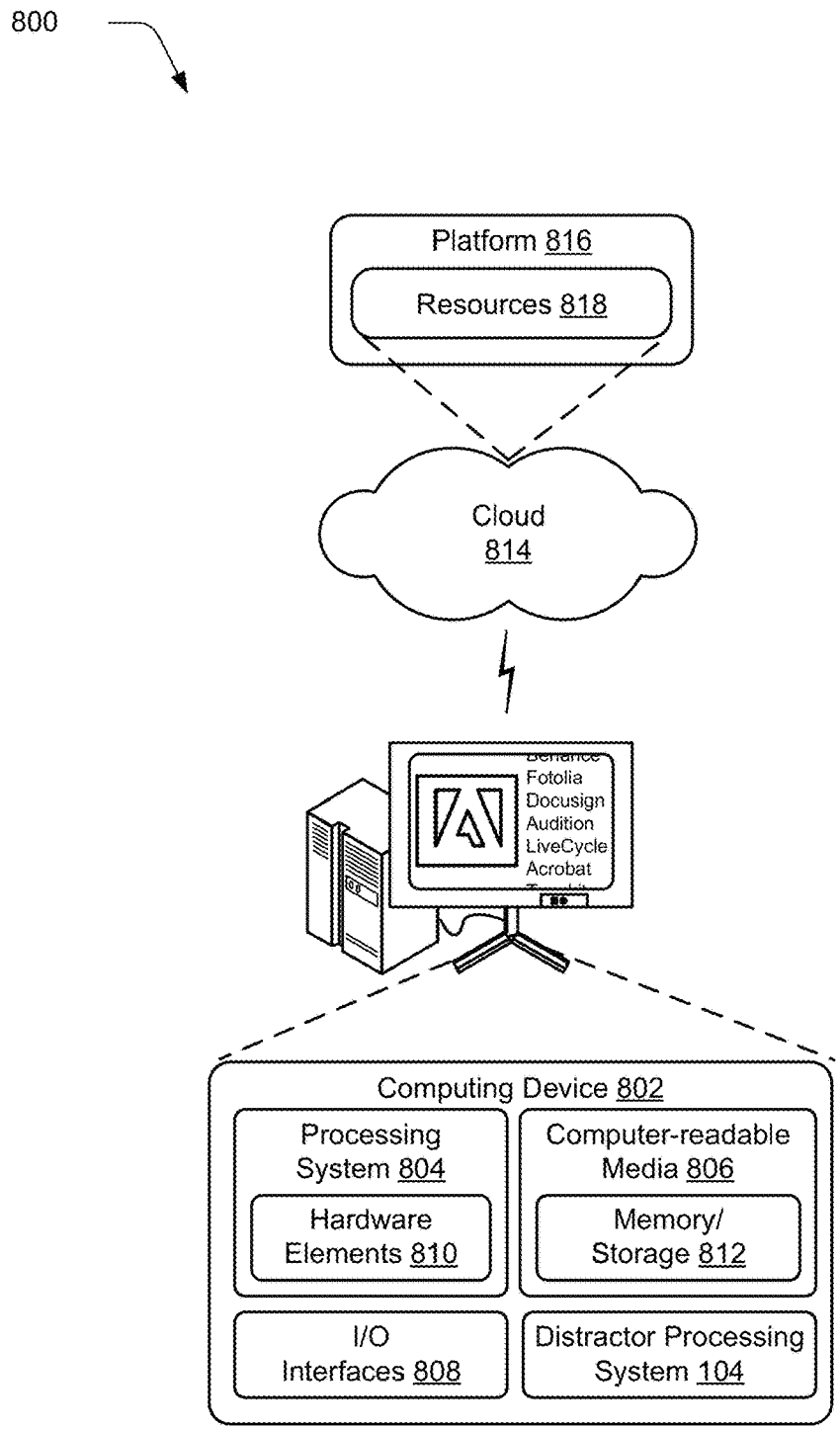
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the distractor processing system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for distractor removal in an image, a method implemented by at least one computing device, the method comprising:
   forming, by the at least one computing device, a plurality of segments from the image;
   calculating, by the at least one computing device, a score for each of the plurality of segments that is indicative of a relative likelihood that a respective said segment is considered a distractor within the image, the calculating based on at least one distractor model trained using machine learning;
   classifying, by the at least one computing device, the plurality of segments as comprising salient objects that are less likely to be considered important to a user and salient objects that are more likely to be considered important to the user based on the calculated scores for the respective segments;
   outputting, by the at least one computing device, the classifications for the plurality of segments; and
   performing, by the at least one computing device, a modification to at least one segment of the plurality of segments based on the classifications of the plurality of segments.

2. A method as described in claim 1, wherein the performing comprises removal of a said salient object that is less likely to be considered important, desaturation of the said salient object that is less likely to be considered important, reduction in contrast of the said salient object that is less likely to be considered important, blurring of the said salient object that is less likely to be considered important, a color transfer of the said salient object that is less likely to be considered important, or retargeting the image such that the said salient object that is less likely to be considered important is no longer in the image.

3. A method as described in claim 1, wherein the performing is controlled though a user input to a user interface.

4. A method as described in claim 3, wherein the user input specifies a threshold for the calculated scores which is used to identify which of the plurality of segments will be modified.

5. A method as described in claim 1, wherein the plurality of segments are formed using a super linear iterative clustering (SLIC) super pixel technique, edge detection technique, or other type of clustering technique.

6. A method as described in claim 1, wherein the scores for each of the plurality of segments is further based on respective locations of each of the plurality of segments within the image.

7. A method as described in claim 1, wherein the at least one distractor model comprises a plurality of distractor models, each distractor model corresponding to a particular type of salient object that is less likely to be considered important.

8. A method as described in claim 1, wherein the classifying comprises ranking the plurality of segments, one to another.

9. A method as described in claim 1, wherein the method further comprises generating the at least one distractor model.

10. In a digital medium environment for distractor removal from an image, a system comprising:
    a distractor processing system, implemented by one or more computing devices, to remove distractors from the image, the distractor processing system including:
        a segmentation module implemented at least partially in hardware to form a plurality of segments from the image;
        a segment prediction module implemented at least partially in hardware to perform operations comprising:
            calculating a score for each of the plurality of segments that is indicative of a relative likelihood that a respective said segment is considered a distractor within the image, the calculation performed using at least one distractor model trained using machine learning;
            classifying the plurality of segments as comprising salient objects that are less likely to be considered important to a user and salient objects that are more likely to be considered important to the user based on the calculated scores for the respective segments;
            outputting the classifications for the plurality of segments; and
        a distractor removal module implemented at least partially in hardware to modify at least one segment of the plurality of segments based on the classification of the at least one segment.

11. A system as described in claim 10, wherein the distractor removal module utilizes a user input specifying a threshold score that determines the at least one segment.

12. A system as described in claim 10, wherein the distractor removal module selects the at least one segment based further on a location of the at least one segment.

13. A system as described in claim 10, wherein the at least one distractor model comprises a plurality of distractor models, each distractor model corresponding to a particular type of salient object that is less likely to be considered important.

14. A system as described in claim 10, wherein the system further comprises a distractor model creation module implemented at least partially in hardware to generate the at least one distractor model.

15. A system as described in claim 10, wherein the operations further comprise ranking the plurality of segments, one to another.

16. A system as described in claim 10, wherein the system is configured as a mobile device.

17. In a digital medium environment for training a distractor model to be used for distractor removal in images, a system comprising:

means for receiving a plurality of images having tagged distractor locations;

means for calculating values for a set of features for respective ones of a plurality of segments within respective ones of the plurality of images; and means for generating the distractor model using one or more machine learning techniques in which the distractor model is trained for detection of the distractors using one or more machine learning techniques with the calculated values and the plurality of images.

18. A system as described in claim 17, wherein the distractor model is trained using the tagged distractor locations as ground truth distractor locations.

19. A system as described in claim 17, wherein the plurality of images are processed through exposure via a user interface in which distractor locations are tagged via user inputs.

20. A system as described in claim 17, wherein the distractor locations comprise portions of the respective images that distract from other portions of the respective images that contain primary subject matter.

\* \* \* \* \*